United States Patent
Krol et al.

(10) Patent No.: US 12,240,043 B2
(45) Date of Patent: Mar. 4, 2025

(54) METHOD AND DEVICE FOR PRODUCING A MULTI-MATERIAL WORKPIECE

(71) Applicant: Nikon SLM Solutions AG, Luebeck (DE)

(72) Inventors: Toni Adam Krol, Luebeck (DE); Christopher Stengel, Luebeck (DE); Dieter Schwarze, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 514 days.

(21) Appl. No.: 17/619,320

(22) PCT Filed: Jun. 16, 2020

(86) PCT No.: PCT/EP2020/066553
§ 371 (c)(1),
(2) Date: Dec. 15, 2021

(87) PCT Pub. No.: WO2020/254284
PCT Pub. Date: Dec. 24, 2020

(65) Prior Publication Data
US 2022/0193771 A1    Jun. 23, 2022

(30) Foreign Application Priority Data

Jun. 18, 2019    (DE) .................... 10 2019 116 503.2

(51) Int. Cl.
*B22F 7/06*        (2006.01)
*B22F 10/28*       (2021.01)
(Continued)

(52) U.S. Cl.
CPC ............... *B22F 7/06* (2013.01); *B22F 10/28* (2021.01); *B22F 10/34* (2021.01); *B22F 10/37* (2021.01);
(Continued)

(58) Field of Classification Search
CPC ................... B23K 15/086; B28B 1/001; B22F 2003/1057
See application file for complete search history.

(56) References Cited

U.S. PATENT DOCUMENTS

2013/0277891 A1*  10/2013  Teulet ................... B29C 64/188
                                                           264/497
2018/0162059 A1*  6/2018  Hofmann ................ B29C 64/40

FOREIGN PATENT DOCUMENTS

DE         10148967         4/2002
DE         102016208196     11/2017
(Continued)

OTHER PUBLICATIONS

Reijonen, J. "Utilizing metallic waste streams as raw material for powder-based additive manufacturing". 2016. Lappeenranta university of technology. (Year: 2016).*
(Continued)

*Primary Examiner* — Nicholas A Wang
(74) *Attorney, Agent, or Firm* — Williams Mullen; Thomas F. Bergert (57) ABSTRACT

In a method for producing a three-dimensional workpiece (12), a first raw material powder (50) is applied to a substrate (18) in order to produce a raw material powder layer consisting of the first raw material powder (50). The raw material powder layer consisting of the first raw material powder (50) is selectively irradiated with electromagnetic radiation or particle radiation in order to produce a solidified first workpiece layer portion (52) from the first raw material powder (50). Non-solidified first raw material powder (50) is then removed from the substrate (18). In the next step, a second raw material powder (54) is applied to the substrate (18), in order to produce a raw material powder layer portion consisting of the second raw material powder (54) adjacent to the first workpiece layer portion (52), The raw material powder layer portion is selectively irradiated with electro-
(Continued)

magnetic radiation or particle radiation in order to produce a solidified second workpiece layer portion (56) from the second raw material powder (54) adjacent to the first workpiece layer portion (52). The non-solidified second raw material powder (54) is heated in order to produce a continuous porous sintered layer portion (58) from the second raw material powder (54) adjacent to the first workpiece layer portion (52) and the second workpiece layer portion (56).

10 Claims, 5 Drawing Sheets

(51) Int. Cl.
| | | |
|---|---|---|
| *B22F 10/34* | (2021.01) | |
| *B22F 10/37* | (2021.01) | |
| *B22F 10/43* | (2021.01) | |
| *B22F 10/66* | (2021.01) | |
| *B22F 10/73* | (2021.01) | |
| *B22F 12/13* | (2021.01) | |
| *B22F 12/17* | (2021.01) | |
| *B22F 12/55* | (2021.01) | |
| *B22F 12/58* | (2021.01) | |
| *B33Y 10/00* | (2015.01) | |
| *B33Y 30/00* | (2015.01) | |
| *B33Y 40/10* | (2020.01) | |
| *B33Y 40/20* | (2020.01) | |
| *B33Y 70/00* | (2020.01) | |
| *B22F 10/00* | (2021.01) | |

(52) U.S. Cl.
CPC .............. *B22F 10/43* (2021.01); *B22F 10/66* (2021.01); *B22F 10/73* (2021.01); *B22F 12/13* (2021.01); *B22F 12/17* (2021.01); *B22F 12/55* (2021.01); *B22F 12/58* (2021.01); *B33Y 10/00* (2014.12); *B33Y 30/00* (2014.12); *B33Y 40/10* (2020.01); *B33Y 40/20* (2020.01); *B33Y 70/00* (2014.12); *B22F 10/00* (2021.01)

(56) References Cited

FOREIGN PATENT DOCUMENTS

| | | | |
|---|---|---|---|
| DE | 102016124401 | | 6/2018 |
| DE | 102017208862 | | 11/2018 |
| EP | 2878402 | | 6/2015 |
| EP | 2961549 | | 1/2016 |
| EP | 3278908 | | 2/2018 |
| JP | 2002115004 | | 4/2002 |
| JP | 2007070655 | | 3/2007 |
| JP | 20091900 | * | 1/2009 |
| JP | 2009001900 | * | 1/2009 |
| JP | 2014516387 | | 7/2014 |
| JP | 2017145178 | | 8/2017 |
| JP | 2018020441 | | 2/2018 |
| JP | 2019081937 | | 5/2019 |
| WO | 2008146698 | | 12/2008 |

OTHER PUBLICATIONS

China Intellectual Property Administration, Examination Report for International Patent Application No. 202080052027.9, Apr. 20, 2023.
China National Intellectual Property Administration, Examination Report for International Patent Application No. 202080052027.9, Mar. 30, 2024.
China Intellectual Property Administration, Examination Report for International Patent Application No. 202080052027.9, Nov. 17, 2023.
Japanese Patent Office, Office Action for JP Application No. 2021-575432, Feb. 14, 2023.
Search Report for German Patent Application No. 10 2019 116 503.2, German Patent and Trademark Office, Jun. 18, 2019.
Standard DI EN ISO 2738 2000- 02-00. Sintered metals, except hard metals—Permeable sintered metals—Determination of density, oil content and open porosity (ISO 2738: 1999); 1999.
International Search Report and Written Opinion for PCT/EP2020/066553, European Patent Office, Aug. 21, 2020.

* cited by examiner

METHOD AND DEVICE FOR PRODUCING A MULTI-MATERIAL WORKPIECE

CROSS-REFERENCE TO RELATED APPLICATIONS

This application is the U.S. national phase of international application PCT/EP2020/066553, filed on Jun. 16, 2020, which claims the benefit of German application DE 10 2019 116 503.2 filed on Jun. 18, 2019; all of which are hereby incorporated herein in their entirety by reference.

TECHNICAL FIELD

The invention relates to a method for producing a three-dimensional workpiece by means of an additive layering method from more than one material. The invention further relates to a device for producing such a three-dimensional workpiece.

BACKGROUND AND SUMMARY

In additive methods for producing three-dimensional workpieces and in additive layering methods in particular, it is known to apply a moulding compound that is initially shapeless or neutral in shape, for example a raw material powder, in layers to a substrate and to solidify it by site-specific irradiation in order ultimately to obtain a workpiece of a desired shape. The irradiation can take place by means of electromagnetic radiation, for example in the form of laser radiation. The moulding compound can initially be present in a starting state as a granulate, as a powder or as a liquid moulding compound and can be solidified as a consequence of the irradiation selectively or, expressed another way, site-specifically. The moulding compound can comprise ceramic, metal or plastic materials, for example, and also material mixtures thereof. In one variant of an additive layering method that is termed powder bed fusion, metal and/or ceramic raw material powder materials are solidified to form three-dimensional workpieces.

To produce individual workpiece layers, it is further known to apply raw material powder material in the form of a raw material powder layer to a substrate and to irradiate it selectively and according to the geometry of the workpiece layer to be produced currently. The laser radiation penetrates the raw material powder material and solidifies this, for example as a consequence of heating, which causes fusion and/or sintering, Once a workpiece layer has been solidified, a new layer of unprocessed raw material powder material is applied to the workpiece layer already produced. Known coater arrangements or powder application devices can be used for this. Renewed irradiation then takes place of the now topmost and as yet unprocessed raw material powder layer. The workpiece is consequently built up successively layer by layer, each layer defining a cross-sectional area and/or a contour of the workpiece. In this context it is further known to access CAD or comparable workpiece data to produce the workpieces substantially automatically.

Known devices for producing three-dimensional workpieces are found, for example, in EP 2 961 549 A1 and in EP 2 878 402 A1. The devices described in these documents each comprise a carrier, which can be lowered downwards layer by layer in a vertical direction. A corresponding vertical movement of the carrier then always takes place in these known devices when a layer of the raw material powder has been completely irradiated and before the next layer of powder is applied. With the increasing use of additive layering methods in the industrial manufacture of complex components, the requirement is growing for methods that facilitate the production of multi-material workpieces.

The invention is therefore directed at the object of specifying a method and a device that facilitate the production of high-quality multi-material workpieces.

In a method for producing a three-dimensional workpiece, a first raw material powder is applied to a substrate in order to produce a raw material powder layer consisting of the first raw material powder. The raw material powder layer consisting of the first raw material powder is selectively, in particular site-selectively, irradiated with electromagnetic radiation or particle radiation to produce a solidified first workpiece layer portion from the first raw material powder. Located on the substrate is then the solidified first workpiece layer portion, which is surrounded by non-solidified, loose first raw material powder. If desired or necessary, in the selective irradiation of the raw material powder layer consisting of the first raw material powder, several first workpiece layer portions formed separately from one another can be produced that can be arranged distributed arbitrarily on the substrate and can be embedded into the surrounding layer of non-solidified first raw material powder.

Non-solidified first raw material powder is then removed from the substrate. In particular, the non-solidified first raw material powder is removed from an area of the substrate that is not covered by the first workpiece layer portion. For example, the non-solidified first raw material powder can be extracted by suction or otherwise removed from the substrate and if applicable also from a process chamber accommodating the substrate, Only the first workpiece layer portion is then still located on the substrate.

In the next step, a second raw material powder is now applied to the substrate in order to produce a raw material powder layer portion consisting of the second raw material powder adjacent to the first workpiece layer portion. In other words, the second raw material powder is applied at least to the area of the substrate that is not covered by the first workpiece layer portion, so that following the application of the second raw material powder, the raw material powder layer portion consisting of the second raw material powder surrounds the first workpiece layer portion. It is accordingly understood here by the term "adjacent" that the raw material powder layer portion consisting of the second raw material powder and the first workpiece layer portion are arranged next to one another with regard to the substrate and not above one another on the substrate. Following application of the raw material powder layer portion to the substrate, a surface of the raw material powder layer portion facing away from the substrate and a surface of the first workpiece layer portion facing away from the substrate are preferably arranged substantially coplanar with one another.

The second raw material powder preferably consists of a material that differs from the material of the first raw material powder(s). For example, the first and the second raw material powder can be a metal powder and a metal alloy powder, respectively. Alternatively, however, it is also conceivable for the first and/or second raw material powder to consist of a ceramic material or a plastic material.

The raw material powder layer portion consisting of the second raw material powder is now, like the raw material powder layer consisting of the first raw material powder previously, selectively, in particular site-selectively, irradiated with electromagnetic radiation or particle radiation, in order to produce a solidified second workpiece layer portion from the second raw material powder adjacent to the first workpiece layer portion. It is understood once again here by the term "adjacent" that the first workpiece layer portion and the second workpiece layer portion are arranged next to one another with regard to the substrate and not above one another on the substrate. In particular, following the selective irradiation of the raw material powder layer portion consisting of the second raw material powder, a surface of the second workpiece layer portion facing away from the substrate and the surface of the first workpiece layer portion facing away from the substrate are arranged substantially coplanar with one another.

When applying the second raw material powder to the substrate, it is not excluded that the second raw material powder will come to lie on the first workpiece layer portion also, at least in small quantities. During the selective irradiation of the raw material powder layer portion consisting of the second raw material powder, however, the areas of the substrate occupied by the first workpiece layer portion are not irradiated, so that this second raw material powder is not solidified and can be removed after the selective irradiation of the raw material powder layer portion consisting of the second raw material powder, for example. For example, the powder can be removed manually or automatically by means of a brush or by extraction by suction.

An irradiation unit that is used to irradiate the raw material powder layers applied to the substrate can comprise at least one optical element. The optical element can be a scan unit, a focusing unit and/or an F-theta lens, for example. Furthermore, the irradiation unit can comprise a radiation source, for example an electron beam source or a laser. The radiation emitted by the irradiation unit can also be supplied to the irradiation unit by a beam source, however, which is located outside the irradiation unit. Mirrors, optical fibres and/or other light conductors can be used for this, for example.

Following the selective irradiation of the raw material powder layer portion consisting of the second raw material powder, the solidified first workpiece layer portion and the solidified second workpiece layer portion are located on the substrate, the first and the second solidified workpiece layer portion being surrounded by non-solidified, loose second raw material powder. If desired or necessary, in the selective irradiation of the raw material powder layer portion consisting of the second raw material powder, several second workpiece layer portions formed separately from one another can also be produced, which can be arranged distributed arbitrarily adjacent to the at least one first workpiece layer portion on the substrate and can be embedded into the surrounding layer of non-solidified second raw material powder.

Finally, in the method for producing a three-dimensional workpiece, the non-solidified second raw material powder remaining following site-selective irradiation of the raw material powder layer portion consisting of the second raw material is heated in order to produce, adjacent to the first workpiece layer portion and the second workpiece layer portion, a continuous porous sintered layer portion made of the second raw material powder. It is understood once again here by the term "adjacent" that the first workpiece layer portion, the second workpiece layer portion and the sintered layer portion are arranged next to one another with regard to the substrate and not above one another on the substrate. The sintered layer portion is consequently produced in an area of the substrate that is covered neither by the first workpiece layer portion nor by the second workpiece layer portion. The non-solidified second raw material powder is thus not removed from the substrate like the first non-solidified raw material powder, but is formed into a continuous layer by the impact of temperature.

The sintered layer portion produced from the second raw material powder by the effect of temperature differs from the second workpiece layer portion produced by site-selective irradiation from the second raw material powder in particular due to its reduced material density, i.e. the sintered layer portion has a higher porosity than the second workpiece layer portion. On the other hand, however, the sintered layer portion no longer contains substantially any individual powder particles, i.e. at least the vast majority of the powder particles of the second raw material powder that were originally present in the form of individual grains of powder are bonded to one another in the sintered layer portion, it still being entirely possible to recognise the original powder particle form, however. The sintered layer portion and the second workpiece layer portion can easily be distinguished optically, i.e. on the basis of microscope examinations, from one another. Furthermore, differentiation of the sintered layer portion from the second workpiece layer portion is possible by porosity examinations. The porosities of the sintered layer portion and the second workpiece layer portion can be determined, for example, by computer tomography or by porosity measurements according to EN ISO 2738.

On completion of the heating step, the solidified first workpiece layer portion, the solidified second workpiece layer portion and the sintered layer portion surrounding the first and second workpiece layer portion are located on the substrate. Another raw material powder layer consisting of the first raw material powder can now be applied to this solid "base" and the above steps can be repeated until the three-dimensional workpiece is fully built layer by layer and has the desired shape. The substrate can have a horizontal surface to which the raw material powder can be applied in layers, i.e. in horizontal layers. Furthermore, the substrate can be lowered downwards layer by layer in a vertical direction.

A multi-material workpiece can be produced in this way, in which areas produced from the first and the second raw material powder can be arranged distributed in the workpiece in any way. Furthermore, mixing of the two raw material powders is reliably avoided in the method, as the application of loose raw material powder to a raw material powder layer lying underneath it is avoided. On the contrary, each of the two raw material powders is always applied to a solid "base", which is formed in the first layer by the substrate and in the layers lying above by the sintered layer portion, the solidified first workpiece layer portion and/or the solidified second workpiece layer portion, A high-quality multi-material workpiece can be produced in this way.

A powder application device can be used to apply the first and the second raw material powder to the substrate. The powder application device can comprise a roller, a slider or another suitable component that is adapted to travel in a horizontal direction across the surface of the substrate or a layer already built on the substrate, which is formed by the sintered layer portion, the solidified first workpiece layer portion and/or the solidified second workpiece layer portion, and to apply a new powder layer in doing so.

The powder application device is preferably adapted to apply both the first and the second raw material powder to the substrate. A powder application device that is suitable to apply different raw material powders to the substrate can comprise separate powder reservoirs for the first and the second raw material powder, for example. The powder reservoirs can be formed integrated with the component of the powder application device that is movable across the surface of the substrate and can likewise move across the surface of the substrate in operation of the powder application device. The first and the second raw material can then be applied either all over or site-selectively to the substrate by suitable control of the powder discharge from the powder reservoirs.

Alternatively to this, however, the powder application device can also comprise fixed powder reservoirs, which are arranged adjacent to the substrate, for example, and from which the moving component of the powder application device removes powder and distributes it over the surface of the substrate. The moving component of the powder application device can comprise a nozzle, for example, which can be moved across the substrate to apply the first and the second raw material powder site-selectively to the substrate.

If desired, the steps described above of producing at least one first workpiece layer portion by applying a first raw material powder to the substrate and subsequent selective irradiation with electromagnetic radiation or particle radiation and the subsequent removal of the non-solidified first raw material powder from the substrate can be carried out repeatedly in the method for producing a three-dimensional workpiece, Different first raw material powders can also be used here. Several first workpiece layer portions, which can consist of the same material or of different materials, can be produced on the substrate in this way before the second raw material powder is applied in the next step to the substrate, i.e. to the areas of the substrate not covered by the first workpiece layer portions.

In addition or alternatively to this, the steps described above of producing a second workpiece layer portion by applying a second raw material powder to the substrate and subsequent selective irradiation of the second raw material powder with electromagnetic radiation or particle radiation before the heating of non-solidified second raw material powder can be carried out repeatedly in the method for producing a three-dimensional workpiece. The continuous porous sintered layer portion can then be produced as a "block" from several raw material powder layer portions arranged above one another. The time required to produce the porous sintered layer portion can be minimised thereby.

Furthermore, just one part of the non-solidified second raw material powder can be heated in order to produce a continuous porous sintered layer portion from the second raw material powder adjacent to the first workpiece layer portion and the second workpiece layer portion. For example, heating and consequent sintering of areas of the non-solidified second raw material powder, which areas are taken up in a surrounding structure following completion of the component, can be dispensed with. It can thereby be ensured that the porous sintered layer portion can be removed completely following completion of the component.

The material of the second raw material powder preferably has a lower melting temperature and/or a higher thermal conductivity than the material of the first raw material powder. The choice of the material with the lower melting temperature and/or the higher thermal conductivity to produce the sintered layer portion makes it possible to minimise the energy and/or time required to produce the sintered layer portion. In addition or alternatively to this, the material of the second raw material powder can be cheaper than the material of the first raw material powder. The material costs for producing the sintered layer portion can be minimised thereby.

The non-solidified second raw material powder for producing the sintered layer portion is preferably heated to a temperature that is below the melting temperature of the material of the second raw material powder. It is thereby ensured that no liquid phase sintering of the non-solidified second raw material powder takes place, but rather that only a diffusion-controlled solid state sintering process takes place. Melting out of the second raw material powder during heating to produce the sintered layer portion is thus securely avoided.

The time required to heat the non-solidified raw material powder to produce a continuous sintered layer portion varies depending on the material properties of the second raw material powder and depending on the geometry of the workpiece to be produced. The time span for heating the non-solidified raw material powder should on the one hand be long enough to produce a continuous sintered layer portion, which portion contains substantially no further individual powder particles, from the non-solidified second raw material powder by a diffusion-controlled solid state sintering process. Contamination of the first raw material powder by particles of the second raw material powder on application of the next layer to the sintered layer portion is reliably prevented by this. On the other hand, however, the time span should be as short as possible to minimise the time outlay required to produce the sintered layer portion and moreover to produce the sintered layer portion with the desired porosity.

The energy input required to produce a continuous sintered layer portion also varies depending on the material properties of the second raw material powder and depending on the geometry of the workpiece to be produced. When processing steel powder, the energy input necessary to produce a steel sintered layer portion, for example, is approx. 50% of the energy input necessary to melt steel powder.

The sintered layer portion can have a porosity determinable by computer tomography or by porosity measurements in accordance with EN ISO 2738 of 10 to 20%, in particular a porosity determinable by computer tomography or by porosity measurements in accordance with EN ISO 2738 of 10 to 15%. The sintered layer portion can then be produced on the one hand with a justifiable time and energy outlay. On the other hand, the individual powder particles in the sintered layer portion are then already bonded to one another such that the sintered layer portion is substantially free from individual powder particles, as desired. In contrast to this, the second workpiece layer portion can have a porosity determinable by computer tomography or by porosity measurements in accordance with EN ISO 2738 of only 0 to 5%, in particular a porosity determinable by computer tomography or by porosity measurements in accordance with EN ISO 2738 of 0 to 2%, so that the second workpiece layer portion produced from the second raw material powder differs significantly from the sintered layer portion both optically and due to its material properties, such as its mechanical or electrical properties, for example.

The sintered layer portion preferably contains powder grains bonded to one another in the area of their surfaces, the shape and size of which grains substantially correspond to the shape and size of the powder grains of the second raw material powder. In other words, the solid state sintering process to produce the sintered layer portion is preferably controlled so that the shape and size of the powder grains of the second raw material powder are substantially retained and material bridges or so-called sintering necks only arise at contact points between powder grains adjacent to one another.

It is conceivable in principle to heat the non-solidified second raw material powder by irradiation with electromagnetic radiation or particle radiation. The non-solidified second raw material powder is preferably heated, however, by means of a heating apparatus, which is formed separately from an irradiation apparatus for the selective irradiation by electromagnetic radiation or particle radiation of a raw material powder layer applied to the substrate. The heating apparatus, which can comprise a laser diode arrangement or a radiant heater, for example, can supply thermal energy to the non-solidified second raw material powder via a surface of the non-solidified second raw material powder that faces away from the substrate. In addition or alternatively to this, the heating apparatus can conduct thermal energy to the non-solidified second raw material powder also via a surface of the non-solidified raw material powder that faces the substrate. The thermal energy can be supplied by heat radiation and/or heat conduction.

For example, the heating apparatus can comprise a first heating element, which is arranged above the substrate in a process chamber accommodating the substrate. Such a heating element can emit thermal energy, for example, in the form of heat radiation to the surface of the non-solidified second raw material powder that faces away from the substrate. In addition or alternatively to this, the heating apparatus can comprise a second heating element, which serves in particular to emit thermal energy to the surface of the non-solidified second raw material powder that faces the substrate. The second heating element can be integrated into the substrate, for example, or be arranged underneath the substrate outside of the process chamber accommodating the substrate. The second heating element can then heat the substrate, which for its part conducts the thermal energy on to the non-solidified second raw material powder.

The non-solidified first raw material powder removed from the substrate is preferably reused for the production of a three-dimensional workpiece. Since mixing of the first and the second raw material powder is avoided as far as possible in the method described here, the effort for separation of the two raw material powders prior to reuse of the raw material powders can be reduced. For example, the non-solidified raw material powder removed from the substrate can be supplied directly to a powder circuit and returned via the powder circuit to the process chamber and used to build further layers of the three-dimensional workpiece. Alternatively or in addition to this, the recovered non-solidified first raw material powder can also be used only in a future build process for producing another three-dimensional workpiece. Prior to its reuse for producing a three-dimensional workpiece, the first raw material powder can pass through a powder preparation process and be sized, for example, in particular screened.

On completion of the production process to produce a three-dimensional workpiece, the sintered layer portion is preferably separated from the finished three-dimensional workpiece by a separation process. For example, the sintered layer portion can be separated from the finished three-dimensional workpiece by a machining process. In a particularly preferred embodiment, the separation process for separation of the sintered layer portion from the finished three-dimensional workpiece comprises a singulation process, by which the powder grains contained in the sintered layer portion and bonded to one another are separated from one another again. This is sensible in particular if the solid state sintering process to produce the sintered layer portion is controlled, as described above, such that the shape and size of the powder grains of the second raw material powder are substantially retained and the sintered layer portion contains individual powder grains of the second raw material powder that are bonded to one another only at their contact points, A separation process that also brings about singulation of the powder grains contained in the sintered layer portion is a blasting process, for example.

The individual powder grains of the sintered layer portion that are produced in the singulation process can be reused to produce a three-dimensional workpiece in a future build process. Prior to their reuse to produce a three-dimensional workpiece, the individual powder grains of the sintered layer portion produced in the separation process can pass through a powder preparation process and be sized, for example, in particular screened.

A device for producing a three-dimensional workpiece comprises a powder application device, which is adapted to apply a first and a second raw material powder to a substrate. The device further comprises an irradiation apparatus, which is adapted to selectively irradiate a raw material powder layer applied to the substrate with electromagnetic radiation or particle radiation. A removal apparatus of the device is adapted to remove non-solidified first raw material powder from the substrate. The removal apparatus can comprise a flexible hose, for example, which is connected to a powder conveying apparatus and can be moved manually or automatically relative to the substrate. The device further comprises a heating apparatus, which is adapted to heat a raw material powder layer applied to the substrate. The heating apparatus for heating the raw material powder layer applied to the substrate can be formed in principle by the irradiation apparatus for selectively irradiating the raw material powder layer applied to the substrate with electromagnetic radiation or particle radiation. The heating apparatus is preferably formed, however, separately from the irradiation apparatus for selectively irradiation the raw material powder layer applied to the substrate with electromagnetic radiation or particle radiation. For example, the heating apparatus can comprise a laser diode arrangement or a radiant heater. A control unit, which can be designed in the form of an electronic control unit, for example, is adapted to control the operation of the device and in particular the operation of the powder application device, the irradiation apparatus, the heating apparatus and if applicable also the removal apparatus.

In particular, the control unit is adapted to control the operation of the device so that the first raw material powder is applied to the substrate by means of the powder application device in order to produce a raw material powder layer consisting of the first raw material powder, the raw material powder layer consisting of the first raw material powder is selectively irradiated with electromagnetic radiation or particle radiation by means of the irradiation apparatus in order to produce a solidified first workpiece layer portion from the first raw material powder, non-solidified first raw material powder is removed from the substrate by means of the removal apparatus, the second raw material powder is applied to the substrate by means of the powder application device to produce a raw material powder layer portion consisting of the second raw material powder adjacent to the first workpiece layer portion, the raw material powder layer portion consisting of the second raw material powder is selectively irradiated with electromagnetic radiation or particle radiation by means of the irradiation apparatus in order to produce a solidified second workpiece layer portion from the second raw material powder adjacent to the first workpiece layer portion, and non-solidified second raw material powder is heated by means of the heating apparatus in order to produce a continuous porous sintered layer portion from the second raw material powder adjacent to the first workpiece layer portion and the second workpiece layer portion.

The control unit is preferably further adapted to control the operation of the device so that before application of the second raw material powder to the substrate, the steps of applying the first raw material powder to the substrate, irradiating the first raw material powder and removing non-solidified first raw material powder from the substrate are carried out repeatedly. A different first raw material powder can be used in each repetition of these steps.

In addition or alternatively to this, the control unit can be adapted to control the operation of the device so that the steps of producing a second workpiece layer portion by applying a second raw material powder to the substrate and subsequent selective irradiation with electromagnetic radiation or particle radiation are carried out repeatedly before heating of non-solidified second raw material powder.

In addition or alternatively to this, the control unit can be adapted to control the operation of the device so that only a portion of the non-solidified second raw material powder is heated in order to produce a continuous porous sintered layer portion from the second raw material powder adjacent to the first workpiece layer portion and the second workpiece layer portion.

The control unit can further be adapted to control the heating apparatus so that the non-solidified second raw material powder for producing the sintered layer portion is heated to a temperature that is below the melting temperature of the material of the second raw material powder. In addition or alternatively to this, the control unit can be adapted to control the heating apparatus so that the non-solidified second raw material powder for producing the sintered layer portion is heated for a desired time span. In addition or alternatively to this, the control unit can be adapted to control the heating apparatus so that the non-solidified second raw material powder for producing the sintered layer portion is heated by an energy input that is smaller than a melt energy input that would cause heating of the material of the second raw material powder to its melting temperature.

The heating apparatus can be adapted to supply thermal energy to the non-solidified second raw material powder via a surface of the non-solidified second raw material powder facing away from the substrate and/or a surface of the non-solidified second raw material powder facing the substrate.

For example, the heating apparatus can comprise a first heating element, which is arranged above the substrate in a process chamber accommodating the substrate. In addition or alternatively to this, the heating apparatus can comprise a second heating element, which is integrated into the substrate or is arranged below the substrate outside of the process chamber accommodating the substrate.

The device preferably further comprises a separation apparatus, which is adapted to separate the sintered layer portion from the finished three-dimensional workpiece on completion of the production process for producing a three-dimensional workpiece. The separation apparatus is adapted in particular to cingulate the sintered layer portion into individual powder grains and can be implemented in the form of a blasting device, for example.

The invention is explained in greater detail below on the basis of the enclosed schematic figures. There are depicted.

BRIEF DESCRIPTION OF THE DRAWINGS

DETAILED DESCRIPTION OF EMBODIMENTS

In FIGS. 1 to 4, a device 10 for producing a three-dimensional workpiece 12 is shown. The device 10 comprises a process chamber 14 and an irradiation apparatus 16 arranged above the process chamber 14. The process chamber 14 is sealed against the ambient atmosphere so that an inert or reactive gas atmosphere or a pressure that is reduced compared with atmospheric pressure can be set if required in the process chamber 14. Arranged in the process chamber 14 is a substrate 18, which serves to hold raw material powder and the workpiece 12 produced from the raw material powder by an additive layering method. The substrate 18 can be displaced downwards in a vertical direction relative to the process chamber 14 into a build chamber 20.

The irradiation apparatus 16 of the device 10 comprises a beam source, preferably a laser source, which emits light at a wavelength of approximately 1064 nm, for example. Alternatively to this, the beam source (for example, a laser) can also be located outside of the irradiation apparatus 16 and a beam to be guided over the raw material powder can be supplied to the irradiation apparatus 16 by means of an optical fibre, for example. The irradiation apparatus 16 also has optical elements, such as a scan unit, a focusing unit and an F-theta lens, for example. The scan unit is adapted to scan the beam over the topmost raw material powder layer within a horizontal plane (in x-direction and y-direction). The focusing unit is adapted to change or adjust a focus position of the beam (in z-direction) so that a focal plane of the irradiation apparatus 16 is located in the area of the topmost raw material powder layer, which is irradiated by the irradiation apparatus 16. If desired the irradiation apparatus 16 can also comprise several scan units and if applicable also several radiation sources.

The device 10 further comprises a powder application device 22, which is used to apply the raw material powder provided for production of the workpiece 12 in layers to the surface of the substrate 18. The powder application device 22 is adapted to apply different raw material powders to the substrate 18.

In one embodiment, the powder application device 22 comprises a slider, which moves during operation of the powder application device 22 in a horizontal direction over the surface of the substrate 18 and has several powder reservoirs to hold the raw material powder to be applied to the substrate 18. The raw material powders can then be applied as required either all over or site-selectively to the substrate 18 by suitable control of the powder discharge from the powder reservoirs. In an alternative embodiment, the powder application device 22 comprises fixed powder reservoirs, which are arranged adjacent to the substrate 18, for example, and from which the slider of the powder application device 22 removes powder and distributes it over the surface of the substrate 18. The slider then comprises a nozzle, for example, which is movable across the substrate 18 in order to apply the raw material powder site-selectively if required to the substrate.

The device 10 is further equipped with a removal apparatus 24, which makes it possible to remove raw material powder from the substrate 18. In the exemplary embodiment illustrated in the figures, the removal apparatus 24 comprises a flexible hose 26, which can be moved either manually, for example by means of intervention gloves, or automatically inside the process chamber 14. The removal apparatus 24 further comprises a powder conveying apparatus 28, formed here by way of example as a suction pump and connected to the flexible hose 26. In operation of the removal apparatus 24, the hose 26 can be moved over the substrate 18. At the same time, the powder conveying apparatus 28 is operated so that raw material powder can be sucked from the substrate 18.

The powder conveying apparatus 28 is connected to a powder circuit 30, via which powder removed by means of the removal apparatus 24 from the substrate 18 and from the process chamber 14 can be returned to the process chamber 14, i.e. a suitable powder reservoir of the powder application device 22. Provided in the powder circuit 30 is a powder preparation system 32, which is used to prepare powder removed from the substrate 18 by means of the powder removal apparatus 24 prior to its return to the process chamber 14. The power preparation system 32 can comprise a screening system, for example, by means of which the raw material powder can be cleaned and sized. The powder circuit 30 is also connected to a storage container 34. Raw material powder that has been removed from the substrate 18 by means of the removal apparatus 24 but is not to be returned directly to the process chamber 14 can be taken up in the storage container 34. The supply of raw material powder from the powder circuit 30 to the process chamber 14 or the storage container 34 is controlled by means of suitable control valves 36, 38.

The device 10 is further equipped with a heating apparatus 40. In the preferred embodiment of the device 10 shown here, the heating apparatus 40 is formed separately from the irradiation apparatus 16. The heating apparatus 40 can also be formed by the irradiation apparatus 16, however. The heating apparatus 40 is adapted to heat raw material powder applied to the substrate 18. In the exemplary embodiment of a device 10 shown in FIGS. 1 to 4, the heating apparatus 40 comprises a first heating element 42, which is arranged above the substrate 18 in the process chamber 14. The heating apparatus 40 further comprises a second heating element 44 integrated into the substrate 18. In an alternative embodiment, the second heating element 44 can also be arranged underneath the substrate 18 in the build chamber 20 of the device 10, however. It is only substantial that the substrate 18 and consequently raw material powder applied to the substrate 18 can be heated by means of the second heating element 44.

A control unit 46 designed here in the form of an electronic control unit is used to control the operation of the device 10. In particular, the control unit 46 is adapted to control the operation of the powder application device 22, the operation of the irradiation apparatus 16 and the operation of the heating apparatus 40 automatically. If the removal apparatus 24 is suitable for automatic operation, the operation of the removal apparatus 24 is also controlled by the control unit 46.

Finally, the device 10 comprises a separation apparatus 48, which is formed separately from the process chamber 14 and the build chamber 20. In the embodiment shown in the figures, the separation apparatus 48 is designed in the form of a blasting apparatus.

A method for producing the three-dimensional workpiece 12 by means of the device 10 illustrated in FIGS. 1 to 4 is explained below. In the method described here, a first raw material powder 50 is applied to the substrate 18 initially by means of the powder application device 22 under the control of the control unit 46, so that a raw material powder layer consisting of the first raw material powder 50 is produced on the substrate 18. This raw material powder layer is acted upon by means of the irradiation apparatus 16, again under the control of the control unit 46, site-selectively with laser radiation. The energy input of the laser radiation ensures local melting and/or sintering of the first raw material powder 50 and consequently a site-selective solidification of the raw material powder layer consisting of the first raw material powder 50, A solidified first workpiece layer portion 52 is produced here from the first raw material powder 50, see FIG. 1.

Figure 1:
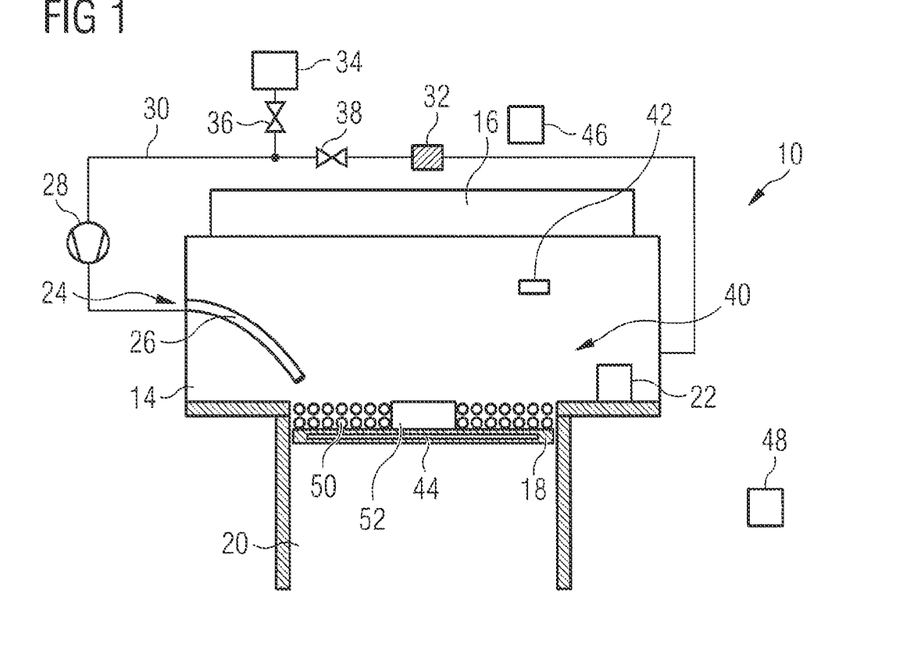
FIG. 1 shows a schematic view of a device for producing a three-dimensional workpiece following the application of a first raw material powder to a substrate and the production of a solidified first workpiece layer portion from the first raw material powder.
Figure 2:
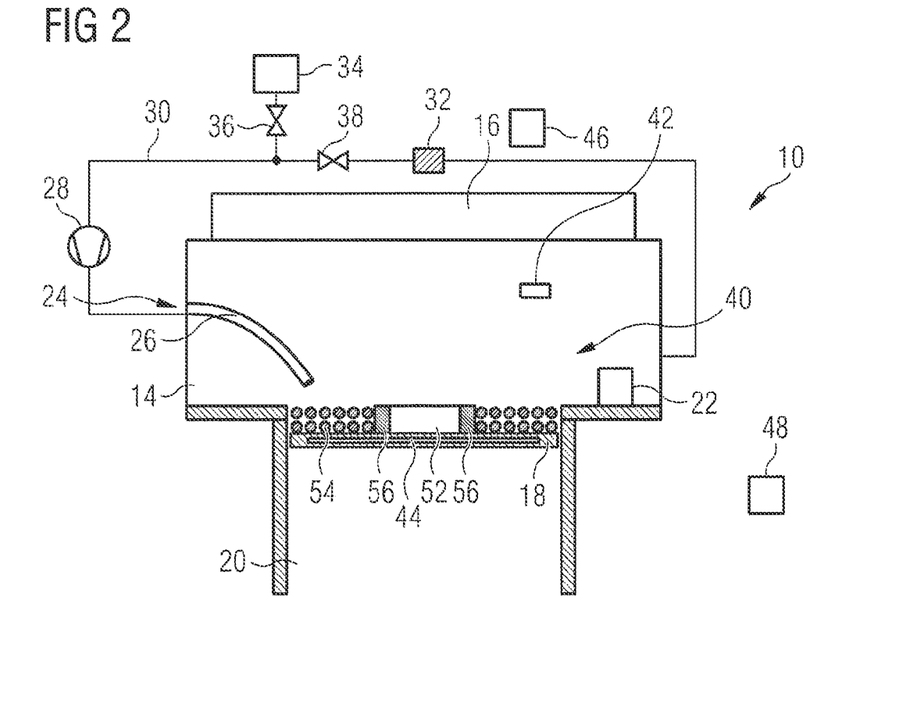
FIG. 2 shows a schematic view of the device according to FIG. 1 following the removal of non-solidified first raw material powder from the substrate, the subsequent application of a second raw material powder to the substrate and the production of a solidified second workpiece layer portion from the second raw material powder adjacent to the first workpiece layer portion.

On completion of the irradiation of the raw material powder layer consisting of the first raw material powder 50, the first workpiece layer portion 52 is consequently arranged on the substrate 18. Only one first workpiece layer portion 52 is illustrated in the figures. Depending on the geometry of the three-dimensional workpiece 12 to be produced, several first workpiece layer portions 52 can also be produced from the raw material powder layer consisting of the first raw material powder 50, however, which are then arranged adjacent to one another on the substrate 18. Furthermore, as yet non-solidified first raw material powder 50 is also located on the substrate 18 in the areas of the raw material powder layer consisting of the first raw material powder 50 that were not acted upon by laser radiation.

The non-solidified first raw material powder 50 is then removed from the substrate 18 by means of the removal apparatus 24. To this end the flexible hose 26 is guided manually or automatically across the substrate 18. The powder conveying apparatus 28 is operated at the same time, so that the non-solidified first raw material powder 50 is sucked from the substrate 18. The first raw material powder 50 extracted by means of the removal apparatus 24 from the process chamber 14 is prepared in the powder preparation system 32 and then either conducted into the storage container 34 or returned via the powder circuit 30 to the process chamber 14 by suitable control of the control valves 36, 38. If the first raw material powder 50 is conducted into the storage container 34, it can be used at a later time to produce another three-dimensional workpiece 12. In contrast thereto, first raw material powder 50 returned to the process chamber 14 is reused directly in the current build process to produce the three-dimensional workpiece 12.

The processing of only one first raw material powder 50 is illustrated in the figures. If desired, however, the steps described above of producing a first workpiece layer portion 52 by application of a first raw material powder 50 to the substrate 18 and subsequent selective irradiation with electromagnetic radiation or particle radiation and the subsequent removal of the non-solidified first raw material powder 50 from the substrate 18 can be carried out repeatedly. In this case different first raw material powders 50 can also be used. Several first workpiece layer portions 52, which can consist of the same material or of different materials, can be produced on the substrate 18 in this way. These first workpiece layer portions 52 are then arranged adjacent to one another on the substrate 18.

Following the removal of the non-solidified first raw material powder 50 from the substrate 18, a second raw material powder 54 is applied to the substrate 18 under the control of the control unit 46 by means of the powder application device 22. Here the application of the second raw material powder 54 to the substrate 18 takes place site-selectively, i.e. the second raw material powder 54 is applied only to the areas of the substrate 18 that are not covered by the first workpiece layer portion(s) 52. A raw material powder layer portion consisting of the second raw material powder 54 is accordingly produced on the substrate 18 adjacent to the first workpiece layer portion(s) 52.

This raw material powder layer portion consisting of the second raw material powder 54 is acted upon by means of the irradiation apparatus 16, again under the control of the control unit 46, site-selectively with laser radiation. The energy input of the laser radiation ensures, as in the irradiation of the first raw material powder 50, local melting and/or sintering of the second raw material powder 54 and consequently site-selective solidification of the raw material powder layer portion consisting of the second raw material powder 54. A solidified second workpiece layer portion 56 is produced here from the second raw material powder 54, which portion is arranged adjacent to the first workpiece layer portion 52 on the substrate 18, see FIG. 2.

In the exemplary embodiment shown in the figures, the first layer of the workpiece 12 comprises only one annular second workpiece layer portion 56, Depending on the geometry of the three-dimensional workpiece 12 to be produced, several second workpiece layer portions 56 can be produced from the raw material powder layer portion consisting of the second raw material powder 54, however, which are then arranged adjacent to one another and adjacent to the first workpiece layer portion(s) 52 on the substrate 18. As yet non-solidified second raw material powder 54 is also located on the substrate 18 in the areas of the raw material powder layer portion consisting of the second raw material powder 54 that were not acted upon by laser radiation.

In the next step, the non-solidified second raw material powder 54 remaining following the site-selective irradiation of the raw material powder layer portion consisting of the second raw material powder 54 is heated by means of the heating apparatus 40. In particular, thermal energy in the form of heat radiation is supplied to the second raw material powder 54 by the first heating element 42 of the heating apparatus 40 via its surface facing away from the substrate 18. At the same time, thermal energy is supplied to the second raw material powder 54 by the second heating element 44 of the heating apparatus 40 via its surface facing the substrate 18, which energy is conducted by the second heating element 44 through the substrate 18.

The operation of the heating apparatus 40 with the two heating elements 42, 44 is controlled here by the control unit 46 such that the non-solidified second raw material powder 54 is only heated to a temperature that is below the melting temperature of the second raw material powder 54, In particular, the control unit 46 controls the operation of the heating apparatus 40 such that the non-solidified second raw material powder 54 is heated for a desired time span to a temperature that is below the melting temperature of the second raw material powder 54.

Due to heating by means of the heating apparatus 40, a diffusion-controlled solid state sintering process is initiated in the non-solidified second raw material powder 54. In particular, the operation of the heating apparatus 40 is controlled by the control unit 46 so that the heat input into the non-solidified second raw material powder 54 is sufficiently great to cause material bridges or so-called sintering necks to be created at contact points between powder grains of the second raw material powder that are adjacent to one another, A continuous porous sintered layer portion 58 is produced thereby, which is substantially free of individual powder particles. The sintered layer portion 58 extends finally adjacent to the first workpiece layer portion(s) 52 and adjacent to the second workpiece layer portion(s) 56, see FIG. 3.

Figure 3:
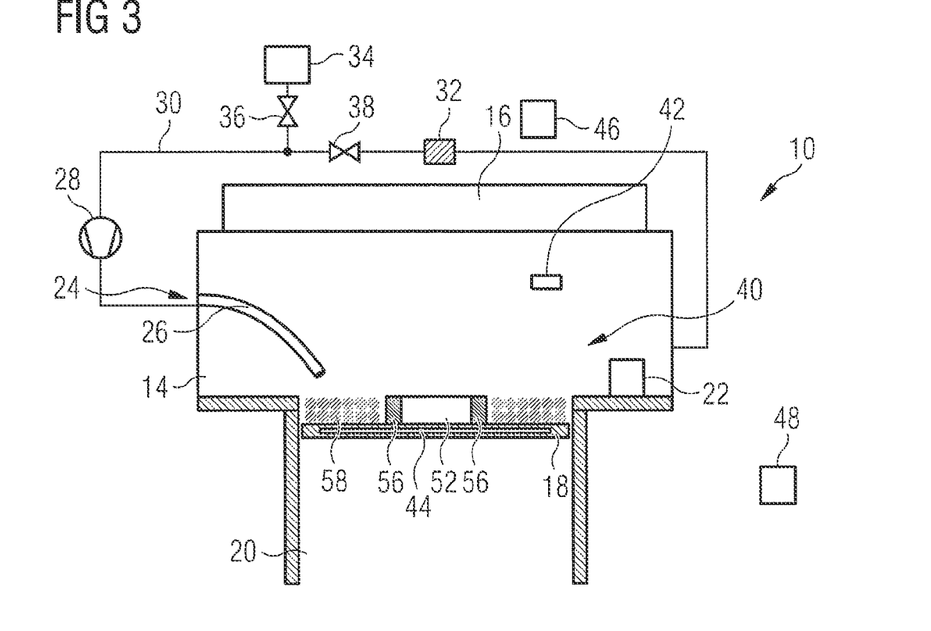
FIG. 3 shows a schematic view of the device according to FIG. 2 following the production of a sintered layer portion from non-solidified second raw material powder.
Figure 4:
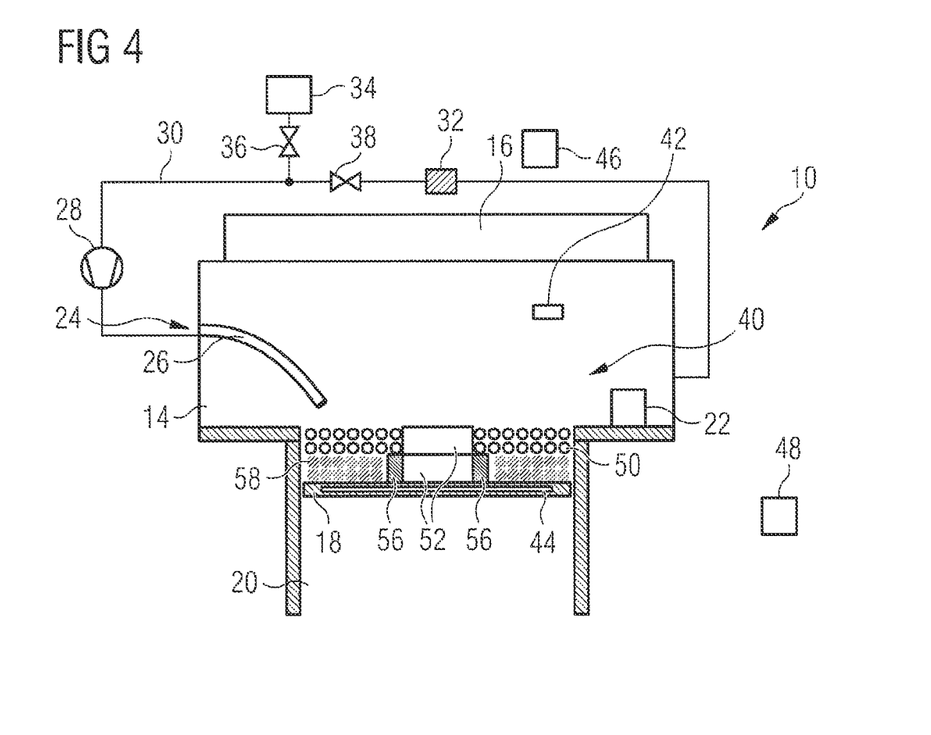
FIG. 4 shows a schematic view of the device according to FIG. 3 following the application of another layer of first raw material powder and the production of another solidified first workpiece layer portion from the first raw material powder on the first workpiece layer portion.

The heat input into the non-solidified second raw material powder 54 is not sufficiently great, however, to cause the second raw material powder 54 to melt. On the contrary, a sintered layer portion 58 is produced that contains powder grains, which although bonded to one another in the area of their surfaces, are of a shape and size that still correspond substantially to the shape and size of the powder grains of the second raw material 54. In particular, the non-solidified second raw material powder 54 for producing the sintered layer portion 58 is heated by an energy input that is smaller than a melt energy input that would cause heating of the material of the second raw material powder 54 to its melting temperature.

The sintered layer portion 58 has, for example, a porosity that can be determined by computer tomography or by porosity measurements in accordance with EN ISO 2738 of 10 to 20%, in particular a porosity that can be determined by computer tomography or by porosity measurements in accordance with EN ISO 2738 of 10 to 15% and thus differs both optically and due to its material properties from the second workpiece layer portion 56 likewise consisting of the second raw material powder 54, which portion has a porosity, for example, that can be determined by computer tomography or by porosity measurements in accordance with EN ISO 2738 of just 0 to 5%, in particular a porosity that can be determined by computer tomography or by porosity measurements in accordance with EN ISO 2738 of 0 to 2%.

Figure 7:
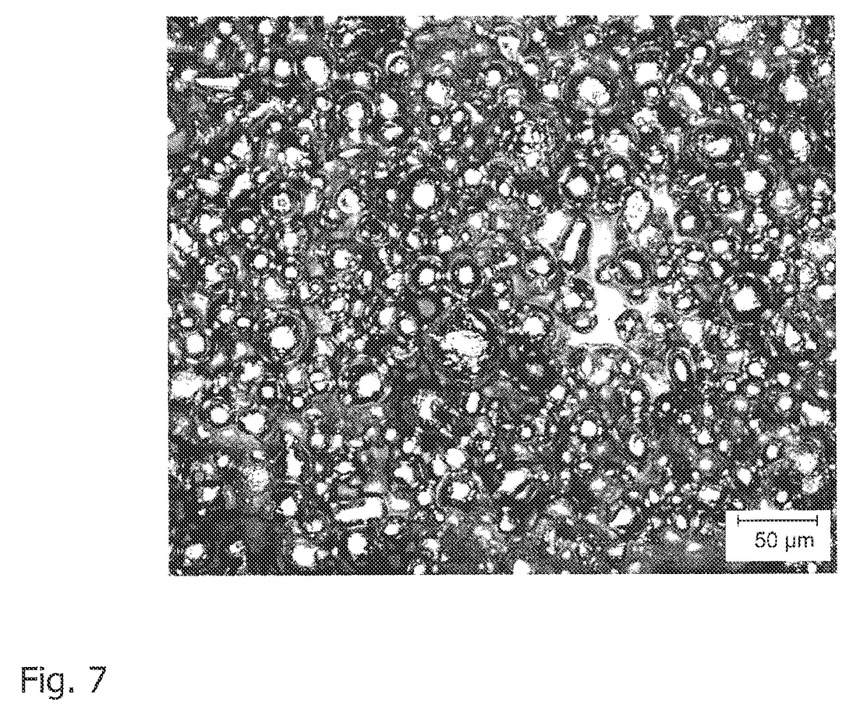
FIG. 7 shows a microscopic image of the surface of a sintered layer portion.
Figure 8:
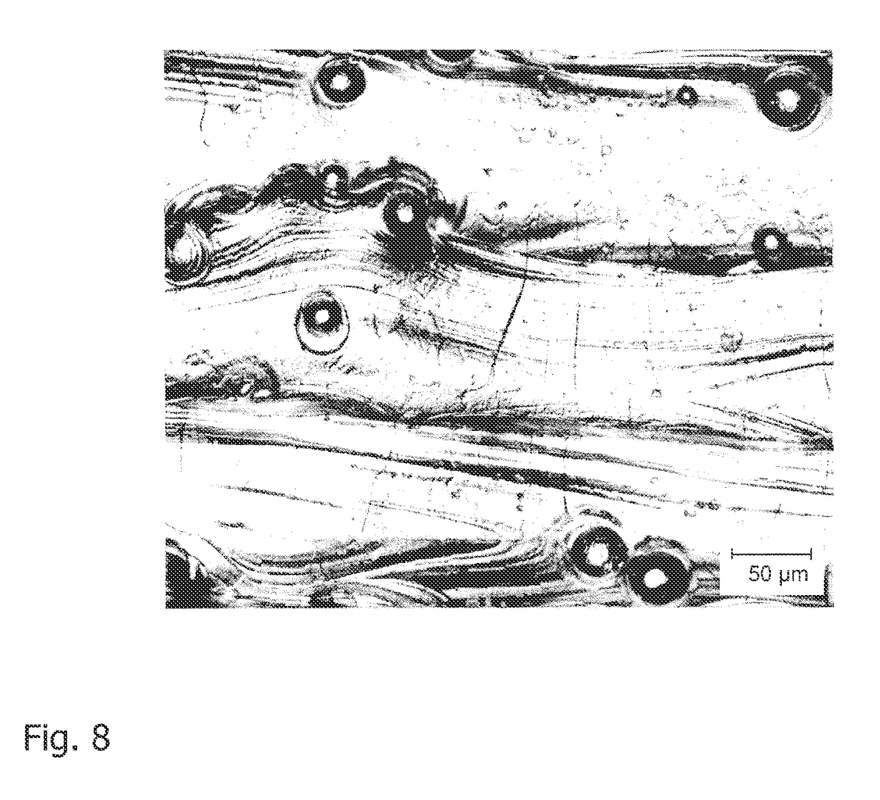
FIG. 8 shows a microscopic image of the surface of a second workpiece layer portion.

FIG. 7 shows a microscopic image of the surface of a sintered layer portion 58, while FIG. 8 shows a microscopic image of the surface of a second workpiece layer portion 56. The image of the sintered layer portion 58 in FIG. 7 shows the sintered powder grains, which are bonded to one another in the area of their surfaces, the shape and size of which still correspond substantially, however, to the shape and size of the powder grains of the second raw material powder 54. In contrast thereto, the microscopic image of the second workpiece layer portion 56 in FIG. 8 shows a fully molten surface structure in which individual powder particles are no longer recognisable.

If desired, the steps described above of producing a second workpiece layer portion 56 by applying a second raw material powder 54 to the substrate 18 and then selects irradiating the second raw material powder 54 with electromagnetic radiation or particle radiation prior to the heating of non-solidified second raw material powder 54 can be carried out repeatedly. The continuous porous sintered layer portion 58 can then be produced as a "block" from several raw material powder layer portions arranged above one another.

Furthermore, just a portion of the non-solidified raw material powder 54 can be heated and thereby processed further into the porous sintered layer portion 58. For example, it is possible to dispense with heating and consequently sintering areas of the non-solidified second raw material powder 54 that are taken up in a surrounding structure following completion of the component.

As is apparent from FIG. 3, following the heating of the non-solidified second raw material powder 54 and the production of the sintered layer portion 58, the solidified first workpiece layer portion 52, the solidified second workpiece layer portion 56 and the sintered layer portion 58 surrounding the first and the second workpiece layer portion are located on the substrate 18. Another raw material powder layer consisting of the first raw material powder 50 is now applied to this solid "base", see FIG. 4, and the above steps are repeated until the three-dimensional mufti-material workpiece 12 is fully built layer by layer and has the desired shape.

Figure 5:
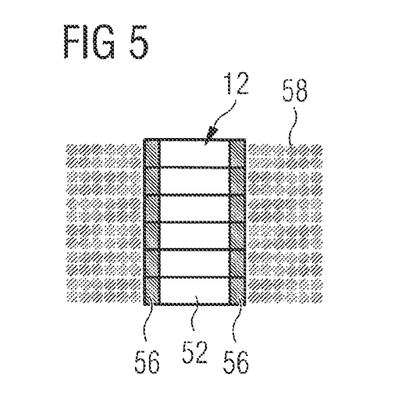
FIG. 5 shows a three-dimensional workpiece produced by means of the device according to FIGS. 1 to 4 with the sintered layer portion connected thereto following removal from the device according to FIGS. 1 to 4.
Figure 6:
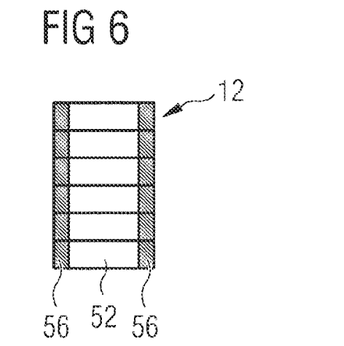
FIG. 6 shows the three-dimensional workpiece according to FIG. 5 following the separation from the sintered layer portion.

Following completion of the multi-material workpiece 12, the workpiece 12 is removed from the build chamber 20 together with the sintered layer portions 58 surrounding the workpiece 12 that are arranged above one another, see FIG. 5. The workpiece 12 is then separated from the sintered layer portions 58 by means of the separation apparatus 48. In particular, the sintered layer portions 58 are treated by means of the separation apparatus 48 designed in the form of a blasting apparatus, so that the workpiece 12 is exposed on the one hand, see FIG. 6, and on the other hand the powder grains forming the sintered layer portion 58 are singulated again. These powder grains can then be prepared by screening, for example, and finally reused to produce another three-dimensional workpiece 12.

The invention claimed is:

1. Method for producing a three-dimensional workpiece with the steps:
(i) applying a first raw material powder to a substrate in order to produce a raw material powder layer consisting of the first raw material powder,
(ii) selectively irradiating the raw material powder layer consisting of the first raw material powder with electromagnetic radiation or particle radiation in order to produce a solidified first workpiece layer portion from the first raw material powder,
(iii) removing non-solidified first raw material powder from the substrate,
(iv) applying a second raw material powder to the substrate in order to produce a raw material powder layer portion consisting of the second raw material powder adjacent to the solidified first workpiece layer portion,
(v) selectively irradiating the raw material powder layer portion with electromagnetic radiation or particle radiation in order to produce a solidified second workpiece layer portion from the second raw material powder adjacent to the solidified first workpiece layer portion,
(vi) heating of non-solidified second raw material powder in order to produce a continuous porous sintered layer portion from the second raw material powder adjacent to the second workpiece layer portion,
the steps (i) to (vi) being repeated wherein each of the first raw material powder and the second raw material powder is always applied to a solid base, wherein the solid base initially comprises the substrate and after the repetition of steps (i) to (vi), the solid base comprises the continuous porous sintered layer portion, the solidified first workpiece layer portion and/or the solidified second work-piece layer portion.

2. Method according to claim 1,
the steps (i) to (iii) being executed multiple times before carrying out step (iv), wherein with each repetition of steps (i) to (iii) a different first raw material powder is used, and/or
the steps (iv) to (v) being executed multiple times before carrying out step (vi), so that in step (vi) the continuous porous sintered layer portion is produced from several raw material powder layer portions arranged above one another, and/or
in step (iv) only a portion of the non-solidified second raw material powder being heated in order to produce a continuous porous sintered layer portion from the second raw material powder adjacent to the second workpiece layer portion.

3. Method according to claim 1,
the material of the second raw material powder having a lower melting temperature and/or a higher thermal conductivity than the material of the first raw material powder.

4. Method according to claim 1,
the non-solidified second raw material powder for producing the sintered layer portion being heated to a temperature that is below the melting temperature of the material of the second raw material powder, and/or
the non-solidified second raw material powder for producing the sintered layer portion being heated for a desired time span, and/or
the non-solidified second raw material powder for producing the sintered layer portion being heated by an energy input that is smaller than a melt energy input that would cause heating of the material of the second raw material powder to its melting temperature.

5. Method according to claim 1,
wherein:
the sintered layer portion has a porosity of 10 to 20%, a porosity of 10 to 15% and/or
the second workpiece layer portion has a porosity of 0 to 5%, a porosity of 0 to 2% and/or
the sintered layer portion contains powder grains that are bonded to one another in the area of their surfaces.

6. Method according to claim 1,
the non-solidified second raw material powder being heated by means of a heating apparatus, which supplies thermal energy to the non-solidified second raw material powder via a surface of the non-solidified second raw material powder that faces away from the substrate and/or a surface of the non-solidified second raw material powder that faces the substrate.

7. Method according to claim 6,
the heating apparatus comprising a first heating element, which is arranged above the substrate in a process chamber accommodating the substrate, and/or the heating apparatus comprising a second heating element, which is integrated into the substrate or is arranged below the substrate outside of the process chamber accommodating the substrate.

8. Method according to claim 1,
the non-solidified first raw material powder removed from the substrate in step (iii) being reused for the production of a three-dimensional workpiece.

9. Method according to claim 1,
the sintered layer portion being separated, on completion of the production process for producing a three-dimensional workpiece, from the three-dimensional workpiece by a separation process, the separation process comprising a singulation process, in particular a blasting process for singulating the sintered layer portion into individual powder grains.

10. Method according to claim 9,
the individual powder grains of the sintered layer portion that are produced in the singulation process being reused to produce a three-dimensional workpiece.

\* \* \* \* \*